(12) United States Patent
Farooqui

(10) Patent No.: US 12,116,025 B2
(45) Date of Patent: Oct. 15, 2024

(54) METHOD FOR CONTROLLING THE VERTICAL POSITION OF A VEHICLE AND ASSOCIATED CONTROL ASSEMBLY

(71) Applicant: ALSTOM Transport Technologies, Saint-Ouen-sur-Seine (FR)

(72) Inventor: Asghar Farooqui, Bangalore (IN)

(73) Assignee: ALSTOM Transport Technologies, Saint-Ouen-sur-Seine (FR)

( * ) Notice: Subject to any disclaimer, the term of this patent is extended or adjusted under 35 U.S.C. 154(b) by 706 days.

(21) Appl. No.: 17/151,528

(22) Filed: Jan. 18, 2021

(65) Prior Publication Data

US 2021/0221411 A1 Jul. 22, 2021

(30) Foreign Application Priority Data

Jan. 21, 2020 (IN) .............................. 202041002712

(51) Int. Cl.
*B61F 5/22* (2006.01)
*B61D 3/04* (2006.01)
*B60G 17/019* (2006.01)
*B61B 1/02* (2006.01)
*B61D 1/00* (2006.01)
(Continued)

(52) U.S. Cl.
CPC .................. *B61F 5/22* (2013.01); *B61D 3/04* (2013.01); *B60G 17/019* (2013.01); *B61B 1/02* (2013.01); *B61D 1/00* (2013.01); *B61F 5/10* (2013.01); *B66B 1/40* (2013.01); *G06V 10/225* (2022.01); *G06V 10/7515* (2022.01); *G06V 20/56* (2022.01)

(58) Field of Classification Search
CPC ..... B61F 5/22; B61F 5/10; B61B 1/02; B61D 3/04; B61D 1/00; G06V 20/56; G06V 10/225; G06V 10/7515; B60G 17/019; B66B 1/40; B61K 9/00
See application file for complete search history.

(56) References Cited

U.S. PATENT DOCUMENTS

2013/0001023 A1\* 1/2013 Leutenegger ........... B66B 3/023
187/394
2017/0349399 A1\* 12/2017 Sonnenmoser ....... B66B 5/0031
(Continued)

FOREIGN PATENT DOCUMENTS

JP H05116627 A \* 5/1993 ................ B61F 5/00
JP 2002505634 A \* 2/2002 ............. B61D 19/02

*Primary Examiner* — Abby Y Lin
*Assistant Examiner* — Karston G. Evans
(74) *Attorney, Agent, or Firm* — Soquel Group LLC

(57) ABSTRACT

A method for controlling a position of a floor of a carriage of a railway vehicle moving on rails, relative to a platform. The carriage includes a body including the floor, at least one bogie, and at least one suspension interposed between the body and the bogie. The method includes determining a level difference between the actual position of the carriage relative to the platform and an expected position of the carriage relative to the platform, adjusting a height of the suspension for compensating the determined level difference. Determining the level difference includes capturing an image of at least one predetermined pattern comprised on the platform with a camera borne by the body, comparing the captured image with a memorized reference image of the at least one pattern of the platform, and calculating a vertical displacement from the images to determine the level difference.

11 Claims, 5 Drawing Sheets

(51) Int. Cl.
*B61F 5/10* (2006.01)
*B66B 1/40* (2006.01)
*G06V 10/22* (2022.01)
*G06V 10/75* (2022.01)
*G06V 20/56* (2022.01)

(56) References Cited

U.S. PATENT DOCUMENTS

2018/0001914 A1* 1/2018 Dausoa ................ B61F 5/00
2019/0062105 A1* 2/2019 Saarela ................ B66B 3/002
2020/0115188 A1* 4/2020 Bitzi .................... G06T 7/74
2020/0379012 A1* 12/2020 Yamasaki .......... G01R 31/2886
2021/0039918 A1* 2/2021 Tang .................... B66B 1/3492

* cited by examiner

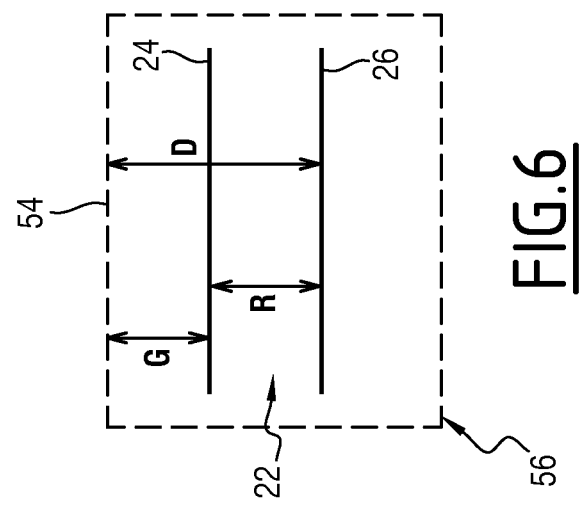
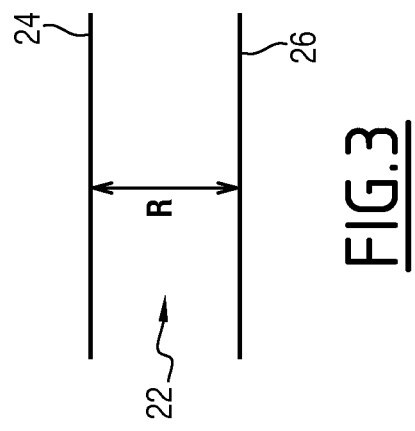
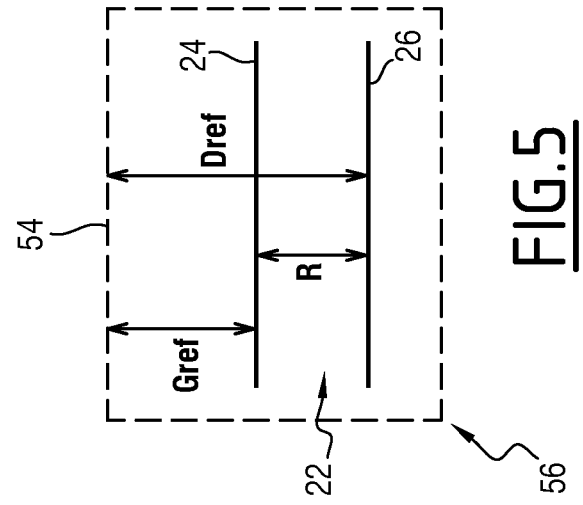
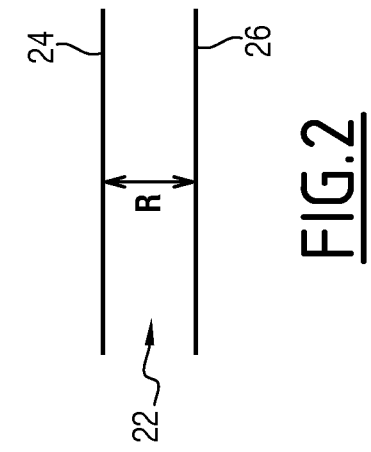

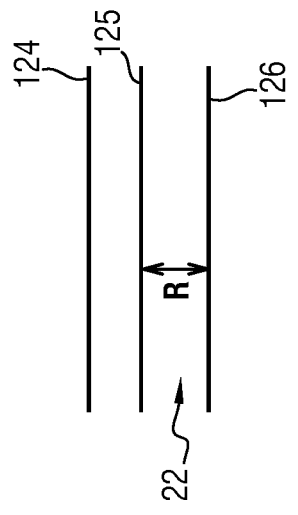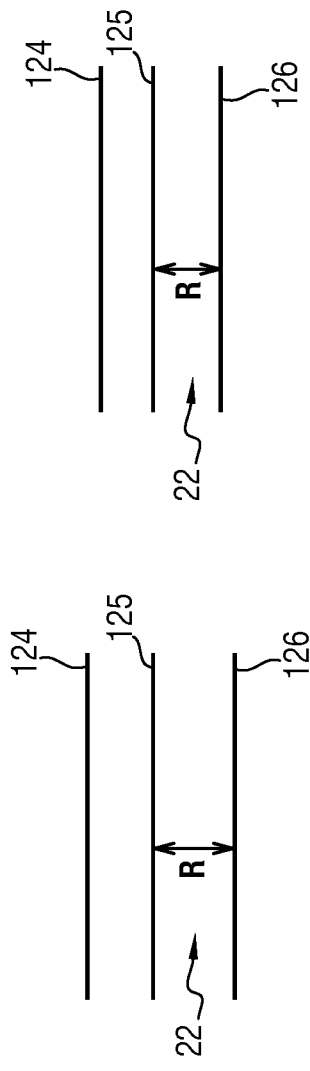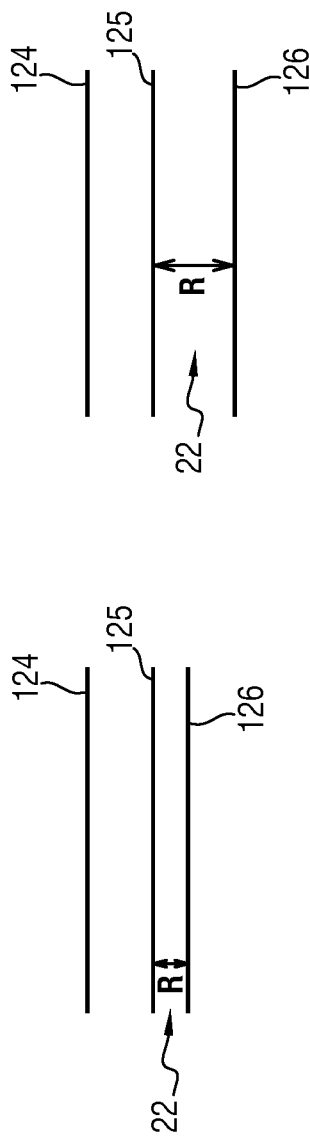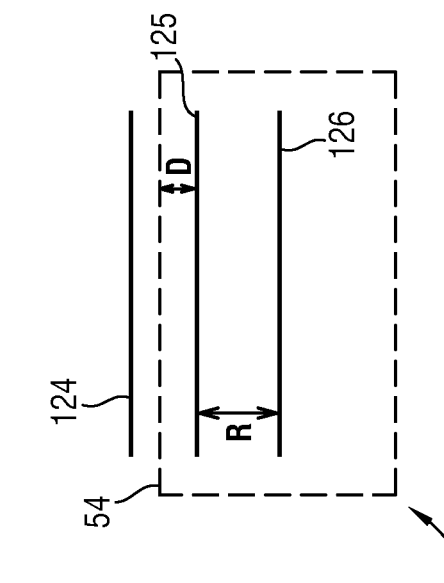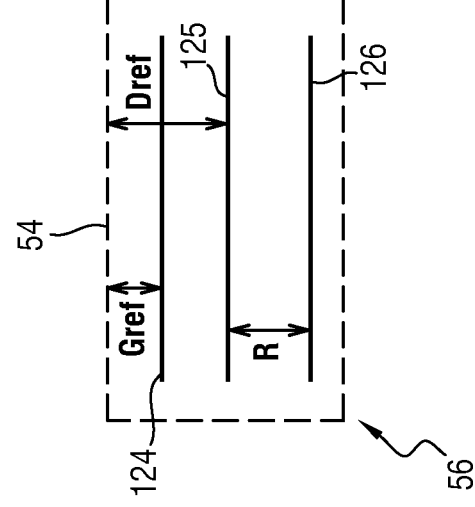

METHOD FOR CONTROLLING THE VERTICAL POSITION OF A VEHICLE AND ASSOCIATED CONTROL ASSEMBLY

CROSS-REFERENCE TO RELATED APPLICATIONS

This application claims priority of Indian Patent Application No. 202041002712, filed on Jan. 23, 2020.

FIELD OF THE INVENTION

The present invention relates to controlling the position of a floor of a carriage of a railway vehicle moving on rails, relative to at least a platform.

BACKGROUND OF THE INVENTION

In the field of railway transport of passengers, a vehicle usually performs several stops in railway stations, in order to allow the exit or the entry of passengers.

The access of the passengers to a carriage operates at the level of the flooring of the carriage which is found globally positioned facing the platform of the station.

However, the difference in heights, which may exist between the floor of the carriage and the platform may prove to be unacceptable for certain users, notably those said to be with reduced mobility.

US 2018/0001914 discloses a method for controlling the position relatively to a platform of a floor of a carriage by measuring the height of at least a suspension, estimating the height of the top of the chassis and adjusting the height of at least one suspension. The step for estimating the height of a suspension comprises, among other calculations, the calculation of the flexure under load of the suspension.

This method is however not entirely satisfactory. Indeed, the method disclosed in this prior art involves several sensors that may incur a significant cost. Furthermore, this method requires the use and the calculation of several parameters which are time-consuming and error-prone.

SUMMARY OF THE DESCRIPTION

An object of the invention is therefore to propose a method allowing simple modifications of the height of a transport vehicle that does not require unnecessary sensors or complex calculation.

For this purpose, the object of the invention is a method wherein the step of determining the level difference includes:
- capturing an image of at least one predetermined pattern comprised on said at least one platform with a camera borne by the body,
- comparing the captured image with a memorized reference image of the at least one pattern of the said platform,
- calculating the vertical displacement from the images to determine the level difference.

According to particular embodiments, the method includes one or several of the following features:
- the memorized reference image has been taken when the carriage is at the expected position relative to the platform;
- the method comprises a verification step after the step of adjusting the height, the verification step comprising:
  - determining the level difference between the actual position of the carriage relative to the platform and the expected position of the carriage relative to the platform and
  - adjusting the height of the suspension for compensating the determined level difference.
- at least one element of the at least one pattern of each platform is distinguishable from the other elements of the at least one pattern, the at least one distinguishable element having a specific geometric feature that is associated only to one platform among each platform,
- the step of determining the level difference including recognizing the platform by recognizing the specific geometric feature and selecting the memorized reference image of the corresponding recognized platform;
- the at least one pattern comprises at least two recognizable parallel lines;
- the at least two recognizable parallel lines are separated by a gap, the size of the gap being specific for each platform;
- the step of determining the level difference includes comparing the position of the parallel lines of the captured image with the position of the parallel lines of the memorized reference image; and
- the step of determining the level difference comprises determining a vertical distance between one of the lines and an upper edge of the image frame and comparing the vertical distance to a reference vertical distance between the same line and an upper edge of a reference image.

The invention also relates to a platform having a pattern for controlling the position of a floor of a carriage of a railway vehicle moving on rails, relatively to the platform, according to the method described above, the pattern comprising at least two recognizable parallel lines separated by a gap, the size of the gap being specific for the platform.

The invention also relates to a control assembly for controlling the position of a floor of a carriage of a railway vehicle moving on rails, relatively to at least a platform, according to the method described above, the carriage comprising:
- a body comprising the floor,
- at least one bogie,
- at least one suspension interposed between the body and the bogie,
- the control assembly,
- the control assembly comprising:
  - a camera placed on the body,
  - a memory, and
  - a controller configured for
    - determining the level difference between the actual position of the carriage relative to the platform and the expected position of the carriage relative to the platform;
    - adjusting the height of the suspension for compensating the determined level difference,
  - the step of determining the level difference including:
    - capturing an image of the at least one pattern placed on the platform with the camera,
    - comparing the captured image with a memorized reference image of the at least one pattern of the said platform,
    - calculating the vertical displacement from the images to determine the level difference.

According to a particular embodiment, the assembly includes the following feature:

the memorized reference image has been taken when the carriage is at the expected position relative to the platform, the memorized reference image being stored in the memory.

BRIEF DESCRIPTION OF THE DRAWINGS

The invention will be better understood upon reading the description which follows, given as an example and made with reference to the appended drawings, wherein:

FIG. 2 is a front view of a first station platform, in accordance with an embodiment of the present invention;

FIG. 3 is a front view of a second station platform, in accordance with an embodiment of the present invention;

FIG. 4 is a front view of a third station platform, in accordance with an embodiment of the present invention;

FIG. 5 is a front view of the second station platform of FIG. 3, in accordance with an embodiment of the present invention;

FIG. 6 is another front view of the second station platform of FIG. 3, in accordance with an embodiment of the present invention;

FIG. 7 is a front view of a first station platform, in accordance with a second embodiment of the present invention;

FIG. 8 is a front view of a second station platform, in accordance with a second embodiment of the present invention;

FIG. 9 is a front view of a third station platform, in accordance with a second embodiment of the present invention;

FIG. 10 is a front view of the second station platform of FIG. 9, in accordance with a second embodiment of the present invention;

FIG. 11 is another front view of the second station platform of FIG. 9, in accordance with a second embodiment of the present invention;

FIG. 12 is another front view of the second station platform of FIG. 9, in accordance with a second embodiment of the present invention;

DETAILED DESCRIPTION

Figure 1:
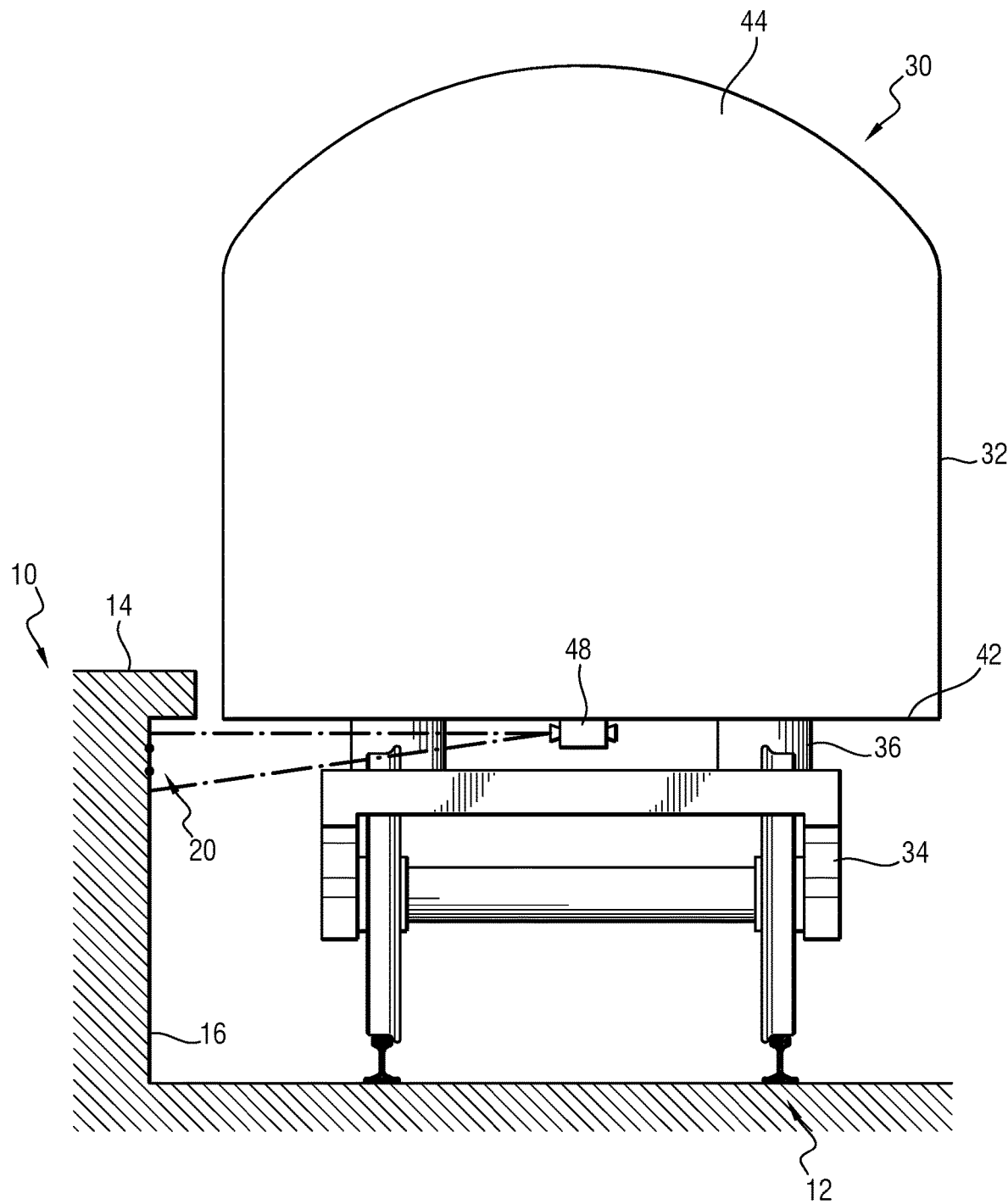
FIG. 1 is a simplified sectional view of a vehicle carriage and of a station platform, in accordance with an embodiment of the present invention.

A platform 10 of a railway station is illustrated, as a section, in a simplified way on FIG. 1. Platform 10 faces at least one railway track 12 and protrudes vertically laterally from railway track 12.

Platform 10 includes an upper surface 14 and a vertical surface 16.

Upper surface 14 is a surface on which passengers stand to get access to a transport vehicle, for example a train, waiting at the station.

Vertical surface 16 faces railway track 12 and includes at least one pattern 20 visible from railway track 12.

The at least one pattern 20 is specific to platform 10. Thus, pattern 20 is distinguishable from any other pattern on any other platform.

The at least one pattern 20 includes at least one distinguishable element 22 that is distinguishable from the other elements of the at least one pattern 20.

Distinguishable element 22 of pattern 20 is specific to pattern 20.

According to the embodiment illustrated in FIGS. 2-6, pattern 20 includes at least two recognizable parallel lines; namely, one upper line 24 and one lower line 26. Upper line 24 and lower line 26 are separated by a gap R. Distinguishable element 22 of pattern 20 is gap R between upper line 24 and lower line 26. Upper lines 24 and lower lines 26 of patterns 20 of a first station platform, of a second station platform and of a third station platform respectively illustrated in FIGS. 2, 3 and 4 are separated by a gap R that is unique and different for each platform.

At least a carriage 30 of a transport vehicle moving on rails is illustrated on FIG. 1.

Figure 13:
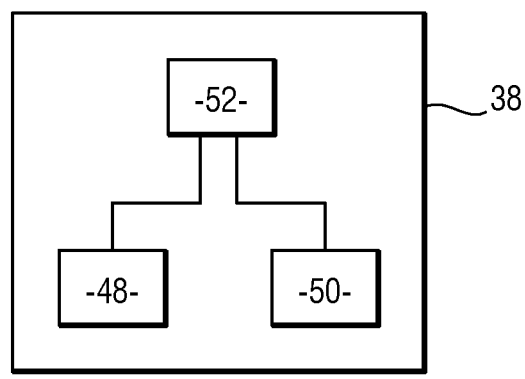
FIG. 13 is a schematic drawing of a control assembly according to the invention, in accordance with an embodiment of the present invention.
Figure 14:
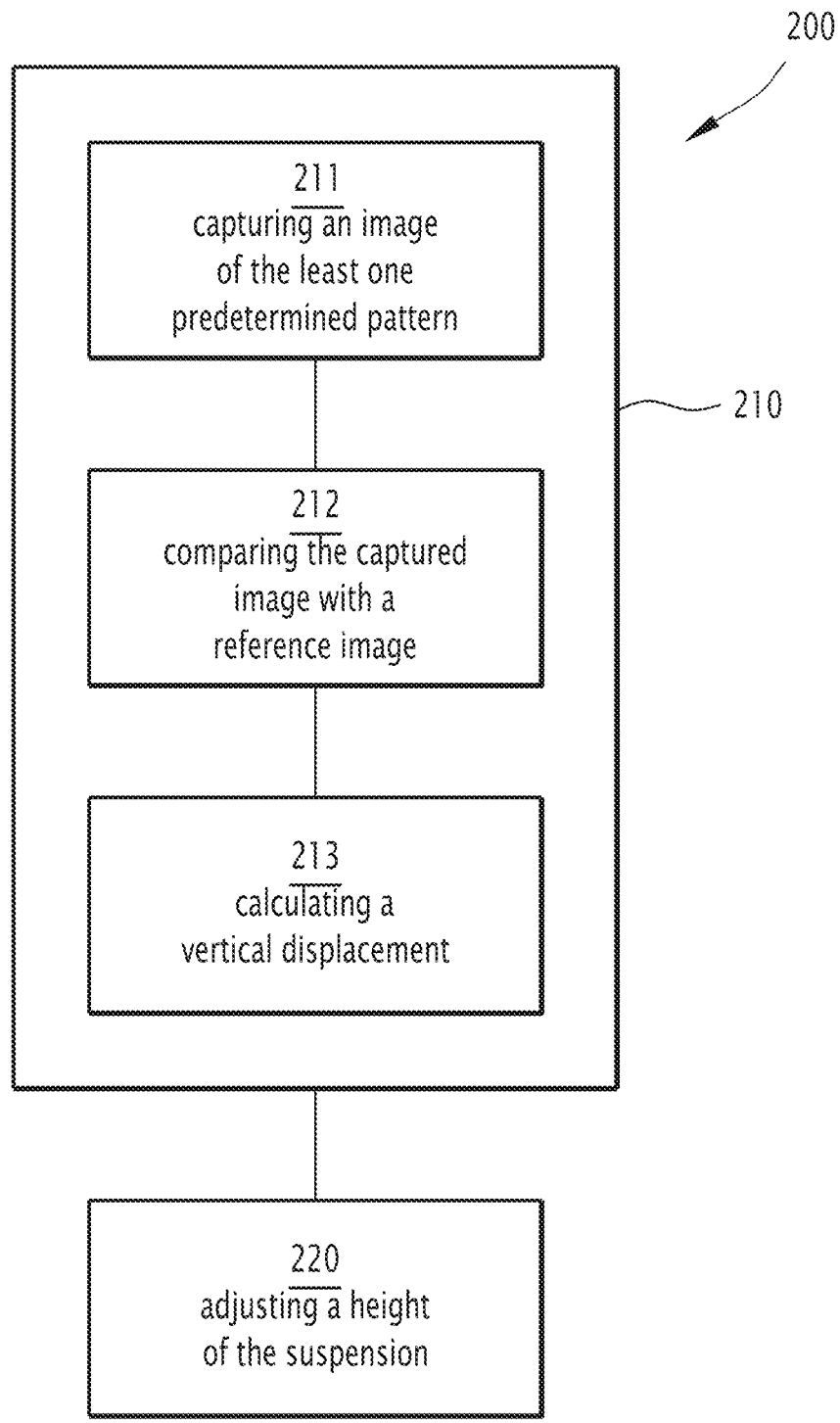
FIG. 14 illustrates a flowchart of a method for controlling a position of a floor of a carriage of a railway vehicle moving on rails, relative to a platform from among a plurality of platforms, according to the invention.

Carriage 30 includes a body 32, at least one bogie 34, at least one suspension 36 interposed between body 32 and bogie 34 and a control assembly 38 (visible in FIG. 13).

Bogie 34 is a standard bogie and will not be described in detail here.

Bogie 34 is at a fixed distance from railway track 12.

Body 32 includes a floor 42 and a passenger compartment 44.

Floor 42 is a surface on which the passengers stand when they are in passenger compartment 44.

When carriage 30 is at a station, floor 42 of carriage 30 and upper surface 14 of station platform 10 may be vertically misaligned. When carriage 30 is at a station, floor 42 of carriage 30 has to be aligned with upper surface 14 of station platform 10 to ensure a safe and easy boarding or deboarding of the passengers.

Suspension 36 is placed between body 32 and bogie 34.

Suspension 36 yields to the load of body 32. For example, suspension 36 contracts when the load of body 32 increases, and expands when the load of body 32 decreases.

Suspension 36 is configured to change the distance between bogie 34 and body 32. For example, suspension 36 includes cylinders to lift or lower body 32 by applying a force on body 32.

Control assembly 38 includes a camera 48, a memory 50 and a controller 52. Control assembly 38 is schematically illustrated in FIG. 13.

Camera 48 is fixed under carriage 30. It extends transversely to the longitudinal axis of body 32.

When carriage 30 is at a station, camera 48 is able to capture an image of the at least one pattern 20 of platform 10.

According to the embodiment illustrated on FIG. 1, camera 48 is borne by body 32.

According to the embodiment illustrated on FIGS. 2-6, camera 48 is configured so that, for any platform 10, upper line 24 and lower line 26 of the at least a pattern 20 are in the field of view of camera 48.

Memory 50 is for example a hard drive memory.

Memory 50 is able to store the images captured by camera 48.

For example, a reference image for each platform 10 may be stored in memory 50, the reference image being an image captured by camera 48 when carriage 30 is at an expected position relative to platform 10.

Carriage 30 is said to be at an expected position relative to platform 10 when, for example, floor 42 of carriage 30 is aligned with upper surface 14 of platform 10.

Controller 52 is, for example, a processor able to process software modules contained in the memory.

Controller 52 is configured to recognize the at least one pattern 20 of an image, and thus recognize platform 10 associated with this pattern 20.

Controller 52 recognizes pattern 20 by recognizing the at least one distinguishable element 22 that is distinguishable from the other elements of pattern 20 and that is specific to pattern 20.

According to the embodiment illustrated on FIGS. 2-6, controller 52 measures gap R between upper line 24 and lower line 26 of pattern 20. Controller 52 also measures the distance between lines of pattern and at least one edge of image frame 56. Controller 52 measures the distance between the lines of pattern 20 and upper edge 54 of image frame 56.

Controller 52 is configured to query a database within memory 50 that associates each distinguishable element 22 with a specific platform 10.

Controller 52 is configured to select a reference image of the recognized platform 10 in the database that is the reference image of the platform 10 associated with the distinguishable element 22.

According to the embodiment illustrated on FIGS. 2-6, when controller 52 measures a gap R between upper line 24 and lower line 26 of pattern 20, controller 52 selects, in the database, the reference image of the specific platform 10 associated with gap R. An exemplary reference image is illustrated in FIG. 5. An exemplary captured image is illustrated in FIG. 6.

Controller 52 is configured to compare the image of platform 10 captured by camera 48 with the reference image of platform 10.

According to the embodiment of FIGS. 2-6, controller 52 measures the distance D between upper edge 54 of image frame 56 and lower line 26 of pattern 20 on the captured image of platform 10, as illustrated in FIG. 6. Controller 52 also recognizes the distance Dref between upper edge 54 of image frame 56 and lower line 26 of pattern on the reference image of platform 10 as illustrated in FIG. 5.

Controller 52 then compares D and Dref.

Controller 52 is then configured to calculate the vertical displacement needed to get carriage 30 to the expected position relative to platform 10. When carriage 30 is at the expected position relative to platform 10, the image frame visible for camera 48 is the same as the reference image. According to the embodiment of FIGS. 5 and 6, controller 52 calculates the vertical displacement L so that D+L=Dref.

Controller 52 is then configured to actuate suspension 36 to elevate or to lower body 32 relatively to bogie 34 to get body 32 at the expected position relative to platform 10. According to the embodiment of FIGS. 5 and 6, controller 52 actuates suspension 36 that makes body 32 move vertically upward or downward relative to bogie 32 by distance L. If L is positive, controller 52 actuates suspension 36 that makes body 32 move vertically upward a distance L. If L is negative, controller 52 actuates suspension 36 that makes body 32 move vertically downward a distance −L.

A method 200 for controlling the position of floor 42 of carriage 30 of a vehicle will now be described.

Method 200 is applied for each bogie 34 of each carriage 30 of the vehicle.

A carriage 30 and a platform 10 as described above are given.

Floor 42 of carriage 30 is at a certain height respective to railway track 12, due to some load on carriage 30.

Carriage 30 stops at platform 10. Memory 50 of control assembly 38 includes a reference image of platform 10. The reference image is captured by camera 48 when carriage 30 is at the expected position relative to platform 10. Carriage 30 is said to be at the expected position relative to platform 10 when floor 42 of carriage 30 and upper surface 14 of platform 10 are aligned. According to the embodiment illustrated on FIGS. 2-6, an example of a reference image of platform 10 is illustrated in FIG. 5.

Method 200 comprises determining 210 a level difference between the actual position of the carriage relative to the platform and an expected position of the carriage relative to the platform.

Determining 210 comprises an operation 211 during which camera 48 captures an image of the at least one pattern 20 on vertical surface 16 of platform 10. According to the embodiment illustrated in FIGS. 2-6, an example of a captured image of platform 10 is illustrated in FIG. 6.

The image of pattern 20 is then sent to controller 52.

Controller 52 recognizes pattern 20 and the at least one distinguishable element 22 distinguishable from the other elements of pattern 20 and specific to pattern 20. By recognizing the distinguishable element 22 of pattern 20, controller 52 recognizes platform 10.

According to the embodiment illustrated in FIGS. 2-6, the distinguishable element 22 is gap R between upper line 24 and lower line 26 of pattern 20.

Controller 52 queries the database within memory 50 that associates each distinguishable element 22 with a specific platform 10.

Controller 52 selects the reference image of recognized platform 10 associated with distinguishable element 22.

According to the embodiment illustrated in FIGS. 5 and 6, controller 52 selects the reference image associated with the recognized gap R between upper line 24 and lower line 26.

Determining 210 further comprises an operation 212 during which controller 52 compares the captured image of platform 10 with the reference image of platform 10.

According to embodiments of FIGS. 2-6, controller 52 measures distance D between the upper edge of image frame 54 and lower line 26 of pattern 20 in the captured image of platform 10 illustrated in FIG. 6. Controller 52 recognizes the distance Dref between the upper edge of image frame 54 and lower line 26 of pattern 20 on the reference image of platform 10 illustrated in FIG. 5. Controller 52 then compares D and Dref.

Determining 210 further comprises an operation 213 during which controller 52 calculates the vertical displacement L necessary so that the image frame visible for camera 48 is the same as the reference image. According to the embodiment of FIGS. 5 and 6, controller 52 calculates the vertical displacement L necessary so that D+L=Dref.

Method 200 further comprises an operation 220 during which controller 52 actuates suspension 36 so that suspension 36 makes body 32 move vertically upward or downward a distance L relative to bogie 34. If L is positive, controller 52 actuates suspension 36 that makes body 32 move vertically upward a distance L. If L is negative, controller 52 actuates suspension 36 that makes body 32 move vertically downward a distance −L.

According to a second embodiment illustrated in FIGS. 7-12, the at least one pattern 20 includes at least three recognizable parallel lines; namely, an upper line 124, a middle line 125 and a lower line 126. Each line 124, 125, 126 is separated from another line 124, 125, 126 by a gap. The at least one distinguishable element 22 is the size R of the gap between middle line 125 and lower line 126. Middle lines 125 and lower lines 126 of patterns 20 of a first station platform, of a second station platform and of a third station platform respectively illustrated in FIGS. 7, 8 and 9, are separated by a gap R that is unique for each platform.

According to the second embodiment, as illustrated in FIG. 12, camera 48 is configured so that, for any platform 10, at least middle line 125 and lower line 126 of at least a pattern 20 are in the field of view of camera 48.

According to the second embodiment illustrated in FIGS. 7-12, controller 52 is configured to measure gap R between middle line 125 and lower line 126.

Alternatively, according to the first embodiment, controller 52 is configured to measure distance G between upper edge 54 of the frame and upper line 24 of pattern 20 on the captured image of a platform 10. An example of a captured image is illustrated in FIG. 6. Controller 52 is also configured to recognize distance Gref between upper edge 54 of image frame 56 and upper line 24 of pattern 20 on the reference image of platform 10. An example of a reference image is illustrated in FIG. 5. The controller is then configured to compare D and Dref, and to compare G and Gref.

Alternatively, according to the second embodiment, controller 52 is configured to measure distance G between upper edge 54 of the frame and upper line 124 of pattern 20 in the captured image of a platform 10. An example of a captured image is illustrated in FIG. 11. Controller 52 is also configured to recognize distance Gref between upper edge 54 of the frame and upper line 124 of pattern 20 in the reference image of platform 10. An exemplary reference image is illustrated in FIG. 10. The controller is then configured to compare D and Dref, and to compare G and Gref.

Alternatively, according to the first and the second embodiment, controller 52 is configured to calculate the vertical displacement L necessary so that D+L=Dref and G+L=Gref.

Alternatively, according to the first and the second embodiment, after the height of body 32 has been adjusted, camera 48 is configured to capture another image and controller 52 is configured to evaluates if D=Dref.

Alternatively, according to the first and the second embodiment, after the height of body 32 has been adjusted, camera 48 is configured to capture another image, and controller 52 is configured to evaluates if D=Dref and G=Gref.

According to the first embodiment, the method for controlling the position of carriage 30 includes a step at which controller 52 measures the distance G between upper edge 54 of the frame and upper line 24 of pattern 20 in the captured image of a platform 10. Controller 52 also recognizes the distance Gref between upper edge 54 of the frame and upper line 24 of the pattern 20 in the reference image of platform 10. Controller 52 then compares D and Dref, and compares G and Gref.

According to the second embodiment, the method for controlling the position of carriage 30 includes a step at which controller 52 measures distance G between upper edge 54 of the frame and upper line 124 of pattern 20 in the captured image of a platform 10. Controller 52 also recognizes distance Gref between upper edge 54 of the frame and upper line 124 of pattern 20 on the reference image of platform 10. Controller 52 then compares D and Dref, and compares G and Gref.

Alternatively, according to the first and the second embodiment, the method for controlling the position of carriage 30 includes a step at which controller 52 calculates the vertical displacement L necessary so that D+L=Dref and G+L=Gref.

Alternatively, according to the first and the second embodiment, after the height of body 32 has been adjusted, the method for controlling the position of carriage 30 includes a step at which camera 48 captures another image and controller 52 evaluates if D=Dref.

Alternatively, according to the first and the second embodiment, after the height of body 32 has been adjusted, the method for controlling the position of the carriage 30 includes a step at which camera 48 captures another image and controller 52 evaluates if D=Dref and G=Gref.

The invention claimed is:

1. A method for controlling a position of a floor of a carriage of a railway vehicle moving on rails, relative to a platform from among a plurality of platforms, the carriage comprising a body comprising the floor, at least one bogie, and at least one suspension interposed between the body and the bogie, the method comprising:
   determining a level difference between the actual position of the carriage relative to the platform and an expected position of the carriage relative to the platform, comprising:
      capturing an image of at least one predetermined pattern comprised on the platform, with a camera borne by the body;
      comparing the captured image with a reference image of the at least one pattern of the platform stored in a memory, the at least one pattern comprising at least two recognizable parallel lines;
      comparing the position of the parallel lines of the captured image with the position of the parallel lines of the reference image; and
      calculating a vertical displacement based on said comparing the captured image and on said comparing the position of the parallel lines, to determine the level difference; and
   adjusting the height of the suspension for compensating the determined level difference.

2. The method according to claim 1, wherein the reference image is captured when the carriage is at the expected position relative to the platform.

3. The method according to claim 1, wherein at least one element of at least one pattern of each of the plurality of platforms is distinguishable from other elements of the at least one pattern, the at least one distinguishable element having a specific geometric feature that is associated only to one platform among the plurality of platforms, and wherein said determining the level difference further comprises:
   recognizing the platform by recognizing the specific geometric feature; and
   selecting the reference image of the corresponding recognized platform.

4. The method according to claim 1, wherein the at least two recognizable parallel lines are separated by a gap, the size of the gap being specific for each platform.

5. The method according to claim 1, wherein said determining the level difference further comprises:
   determining a vertical distance between one of the lines and an upper edge of a frame of the image; and
   comparing the vertical distance to a reference vertical distance between the same line and an upper edge of the reference image.

6. A platform, having a pattern for controlling the position of the floor of the carriage of the railway vehicle moving on rails, relative to the platform, according to the method of claim 1, the pattern comprising at least two recognizable parallel lines separated by a gap, the size of the gap being specific for the platform.

7. A control assembly for controlling the position of the floor of the carriage of the railway vehicle moving on rails, relative to the platform from among the plurality of platforms, the carriage comprising the body comprising the floor, the at least one bogie, the at least one suspension interposed between the body and the bogie, and the control assembly, the control assembly comprising:

the camera borne by the body;

the memory; and a controller configured for performing the method of claim 1.

8. The control assembly according to claim 7, wherein the reference image is captured when the carriage is at the expected position relative to the platform.

9. A control assembly for controlling the position of the floor of the carriage of the railway vehicle moving on rails, relative to the platform from among the plurality of platforms, according to the method of claim 1, the carriage comprising the body comprising the floor, the at least one bogie, the at least one suspension interposed between the body and the bogie, and the control assembly, the control assembly comprising:

the camera borne by the body;

the memory; and a controller configured for performing the method of claim 1.

10. A method for controlling a position of a floor of a carriage of a railway vehicle moving on rails, relative to a platform from among a plurality of platforms, the carriage comprising a body comprising the floor, at least one bogie, and at least one suspension interposed between the body and the bogie, the method comprising:

determining a level difference between the actual position of the carriage relative to the platform and an expected position of the carriage relative to the platform, comprising:

capturing an image of at least one predetermined pattern comprised on the platform, with a camera borne by the body, the at least one pattern comprising at least two recognizable parallel lines;

comparing the captured image with a reference image of the at least one pattern of the platform stored in a memory;

determining a vertical distance between one of the lines and an upper edge of a frame of the image;

comparing the vertical distance to a reference vertical distance between the same line and an upper edge of the reference image; and calculating a vertical displacement based on the comparing the captured image and on the comparing the vertical distance, to determine the level difference; and adjusting a height of the suspension for compensating the determined level difference.

11. A control assembly for controlling the position of the floor of a carriage of the railway vehicle moving on rails, relative to the platform from among the plurality of platforms, the carriage comprising the body comprising the floor, the at least one bogie, the at least one suspension interposed between the body and the bogie, and the control assembly, the control assembly comprising:

the camera borne by the body;

the memory; and a controller configured for performing the method of claim 10.

* * * * *